United States Patent
London et al.

(10) Patent No.: US 9,357,757 B2
(45) Date of Patent: Jun. 7, 2016

(54) TACKLE BOX WITH INTERCHANGEABLE ROD HOLDING INSERTS

(71) Applicant: Maurice Sporting Goods, Inc., Northbrook, IL (US)

(72) Inventors: James A. London, Grayslake, IL (US); Amanda N. Schantz, Evanston, IL (US); Gregory J. Marchione, Volo, IL (US)

(73) Assignee: Maurice Sporting Goods, Inc., Northbrook, IL (US)

( * ) Notice: Subject to any disclaimer, the term of this patent is extended or adjusted under 35 U.S.C. 154(b) by 56 days.

(21) Appl. No.: 13/714,854

(22) Filed: Dec. 14, 2012

(65) Prior Publication Data

US 2014/0165450 A1   Jun. 19, 2014

(51) Int. Cl.
  *A01K 97/06* (2006.01)
  *A01K 97/08* (2006.01)
  *A01K 97/10* (2006.01)

(52) U.S. Cl.
  CPC .............. *A01K 97/06* (2013.01); *A01K 97/08* (2013.01); *A01K 97/10* (2013.01)

(58) Field of Classification Search
  CPC ....... A01K 97/06; A01K 97/08; A01K 97/10; A01K 97/22
  USPC .............................. 43/25, 25.2, 26, 54.1, 57.1
  See application file for complete search history.

(56) References Cited

U.S. PATENT DOCUMENTS

| | | | |
|---|---|---|---|
| 1,318,007 A | 10/1919 | Gau | |
| 2,285,888 A | 6/1942 | Benton | |
| 2,523,361 A | 9/1950 | Garnham | |
| 2,555,073 A * | 5/1951 | Zdankoski | ........................ 43/55 |
| 2,596,403 A * | 5/1952 | Hoffman | ........................ 43/21.2 |
| 2,691,840 A | 10/1954 | Smith | |
| 2,767,502 A | 10/1956 | Reynolds | |
| 3,199,243 A | 8/1965 | Caston | |
| 3,935,977 A * | 2/1976 | Bonnett | .............. A63C 11/025 211/70.5 |
| 4,216,604 A | 8/1980 | Starke | |
| 4,418,490 A | 12/1983 | Ancona | |
| 4,500,128 A * | 2/1985 | McClure | ........................ 294/146 |
| 4,529,112 A | 7/1985 | Miller | |
| 4,747,490 A * | 5/1988 | Smith | ........................ 206/542 |
| 4,890,731 A * | 1/1990 | Mroz | ........................ 206/315.9 |
| 4,920,683 A | 5/1990 | Weber | |
| D311,449 S | 10/1990 | Paschal | |
| 5,056,256 A | 10/1991 | Truax | |
| 5,297,676 A | 3/1994 | Coleman | |
| 5,319,874 A * | 6/1994 | Vance | .............................. 43/26 |
| 5,371,968 A | 12/1994 | Casey | |

(Continued)

*Primary Examiner* — David Parsley
(74) *Attorney, Agent, or Firm* — Patzik, Frank & Samotny Ltd.

(57) ABSTRACT

A fishing tackle box includes interchangeable inserts for holding sections of a fishing rod. Each interchangeable insert is releasably held within an associated retaining channel of a body of the tackle box by snap-fit engagement. Each interchangeable insert includes a plurality of apertures and cylindrical channels to hold differently-sized cross-sections of fishing rod segments through snap-fit engagement. Multiple, differently sized interchangeable inserts are held in a spaced orientation by the tackle box body, thus accommodating the longitudinal tapering of the segments of the fishing rod. Through the use of interchangeable inserts, the same fishing tackle box may be releasably secured to a variety of differently sized fishing rods by selecting appropriately sized interchangeable inserts dimensioned to match the particular fishing rod to be releasably held by the tackle box.

9 Claims, 4 Drawing Sheets

(56) References Cited

U.S. PATENT DOCUMENTS

| | | |
|---|---|---|
| D355,071 S | 2/1995 | Stull |
| D360,015 S | 7/1995 | Cosby et al. |
| 5,502,916 A | 4/1996 | Krewson, Jr. |
| 5,505,014 A | 4/1996 | Paullin |
| 5,515,640 A | 5/1996 | Cosby et al. |
| 5,588,245 A | 12/1996 | Vance |
| 5,815,894 A * | 10/1998 | Soriano .................. 24/510 |
| D405,499 S | 2/1999 | Beauvais |
| 5,938,023 A | 8/1999 | Herron et al. |
| 6,085,455 A | 7/2000 | Bracken et al. |
| 6,269,587 B1 | 8/2001 | Wallace |
| 6,370,810 B1 * | 4/2002 | Widerman .................. 43/21.2 |
| 6,606,814 B1 | 8/2003 | Weaver |
| 6,711,847 B1 | 3/2004 | Udelhoven |
| 7,051,471 B1 | 5/2006 | Ausborne |
| 7,392,901 B2 | 7/2008 | Cameron et al. |
| D586,876 S | 2/2009 | Kern |
| 7,621,073 B2 | 11/2009 | O'Keefe |
| D663,378 S | 7/2012 | Osman |
| 2002/0116861 A1 | 8/2002 | Stockdale |

\* cited by examiner

TACKLE BOX WITH INTERCHANGEABLE ROD HOLDING INSERTS

BACKGROUND OF THE INVENTION

1. Field of the Invention

The present invention relates, in general, to fishing equipment and, more particularly, to a tackle box that is releasably attachable to a fishing rod.

2. General Background of the Invention

Fishing has become a tremendously popular sport. In a national survey conducted by the U.S. Fish and Wildlife Service, an estimated 30 million U.S. residents participated in fishing in the year 2006, spending an estimated $42 billion in fishing-related expenses during the year.

Basic equipment required or desirable for fishing include not only a rod, reel and line, but a wide variety of smaller items of fishing tackle, including, for example fishing hooks, lures, floats, and sinkers. Tackle boxes are often employed to store, organize, and transport these items. Moreover, fishing rods are commonly available in both one-piece and two-piece varieties. Two-piece fishing rods are often valued for their ease of transport, as they can be broken down and readily carried by backpackers, stored in the trunks of vehicles, and taken on airplanes.

While each of these items of fishing equipment is commonly available separately for purchase, for those new to fishing, or for those who may fish only occasionally, complete starter kits, containing each of these components, are also available for purchase. Such kits may include, for example, a fishing reel pre-spooled with line and attached to a one-piece or two piece fishing rod, together with a tackle box containing a basic set of tackle. As these kits are intended for sale and use as a unit, there is a need to package their individual components together, both for presentation at a point of purchase, and for easy storage and transport by the purchaser.

BRIEF SUMMARY OF THE INVENTION

The present invention comprises a fishing tackle box that includes interchangeable inserts for holding sections of a fishing rod. Each interchangeable insert is releasably held within an associated retaining channel of a body of the fishing tackle box by snap-fit engagement. Each interchangeable insert includes a plurality of apertures and cylindrical channels to hold differently-sized cross-sections of fishing rod segments through snap-fit engagement. Multiple, differently sized interchangeable inserts are held in a spaced orientation by the fishing tackle box body, thus accommodating the longitudinal tapering of the segments of the fishing rod. Through this use of interchangeable inserts, the same fishing tackle box may be releasably secured to a variety of differently sized fishing rods by selecting appropriately sized interchangeable inserts that have been previously manufactured with specific dimensions to match the particular fishing rod to be releasably held by the tackle box. This ability to use a common fishing tackle box body within various kits that include a fishing rod, a fishing tackle box, and fishing tackle, where each of the various kits can include a fishing rod having a different cross-sectional dimension, provides a cost savings to the manufacturer, compared to the custom manufacture of different tackle boxes sized for attachment to different fishing rods of differing dimensions.

DETAILED DESCRIPTION OF THE INVENTION

Figure 1:
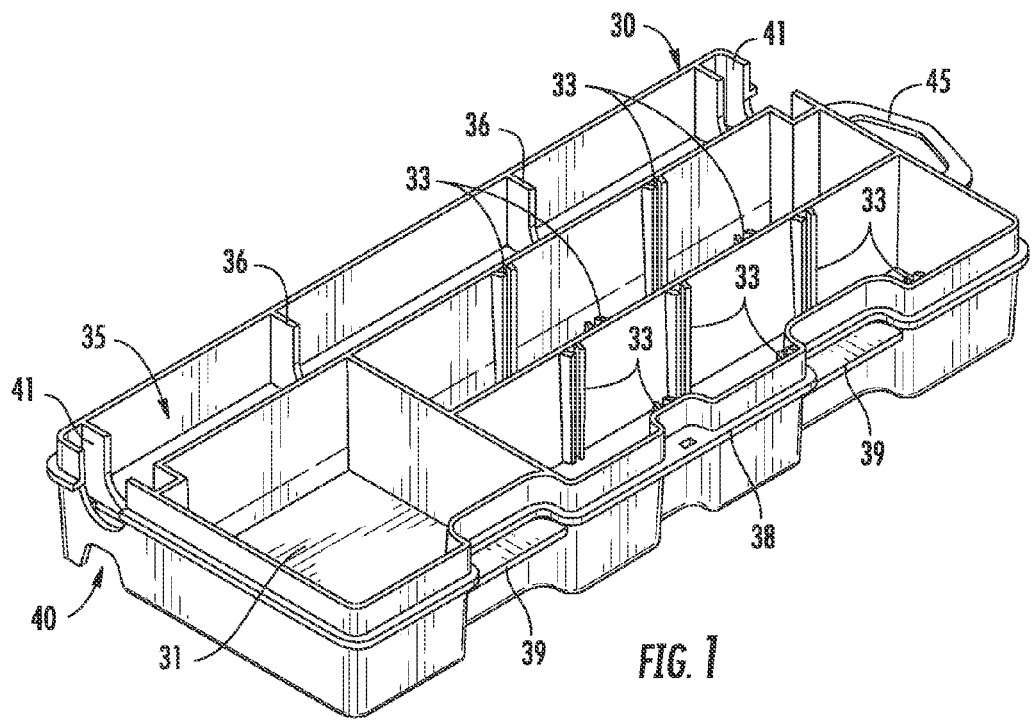
FIG. 1 is a top perspective view of the body of a tackle box of the present invention.

While the present invention is susceptible of embodiment in many different forms, there is shown in the drawings and will herein be described in detail, one specific embodiment, with the understanding that the present disclosure is intended as an exemplification of the principles of the present invention and is not intended to limit the invention to the embodiment illustrated.

Figure 7:
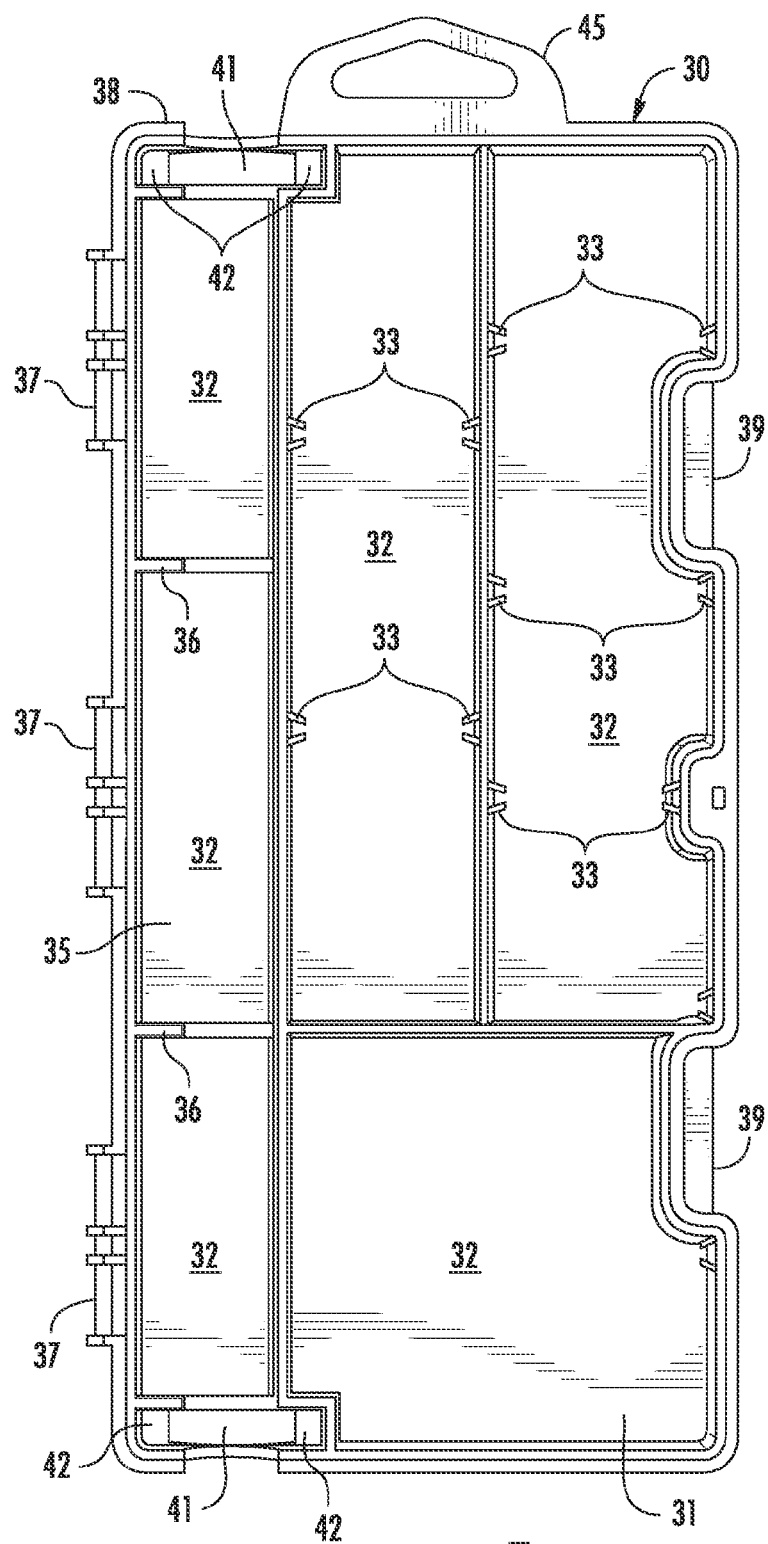
FIG. 7 is a bottom plan view of the tackle box body of FIG. 1.
Figure 8:
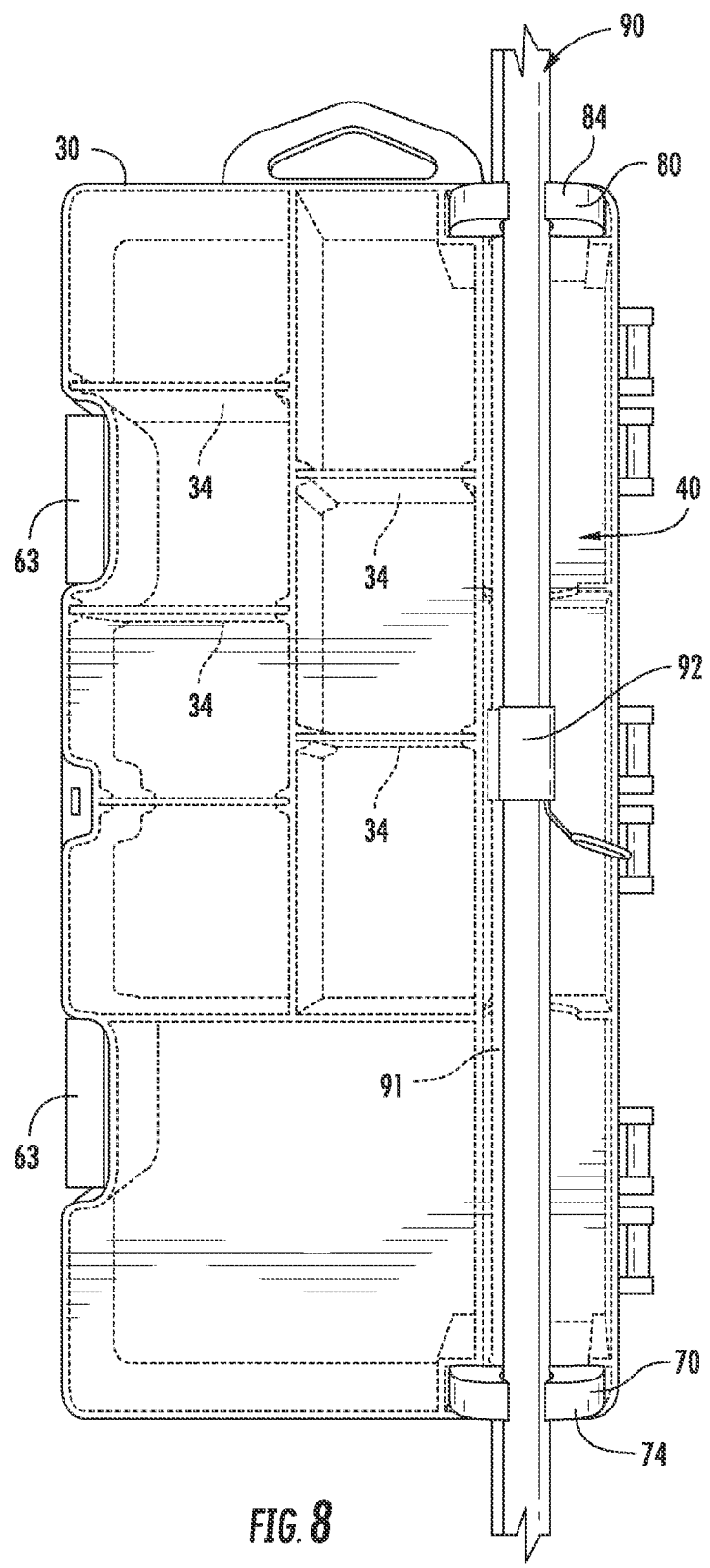
FIG. 8 is a bottom plan view of the tackle box of FIG. 5 showing, in particular, both halves of a two-piece fishing rod held by the rod holding inserts.

A preferred embodiment of the present tackle box, having interchangeable rod holding inserts, is shown in FIGS. 1-8 as comprising body 30, lid 50, first rod holding insert 70, and second rod holding insert 80. Tackle box body 30 is preferably constructed of a relatively rigid plastic material, and comprises interior 31, having a plurality of compartments 32. Some compartments are preconfigured, while others are user-configurable. Specifically, body 30 includes several pairs of opposed vertical channels 33, each capable of accepting and releasably retaining an associated removable divider wall 34. Each removable divider wall may be inserted into interior 31 of body 30 by sliding opposing side edges of divider wall 34 vertically within opposing vertical channels 33, until a bottom edge of divider wall 34 contacts a bottom interior surface of tackle box body 30. As best seen in FIGS. 7 and 8, in a preferred embodiment, five opposing pairs of vertical channels 33 are provided, as are four removable divider walls 35.

Figure 2:
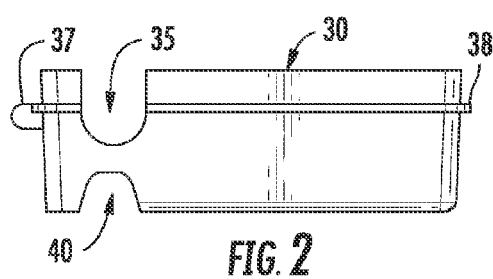
FIG. 2 is a right side view of the tackle box body of FIG. 1.

Tackle box body 30 further includes first rod holding channel 35, having two stiffening ribs 37 disposed therein. As best seen in FIGS. 2 and 7, three pairs of lid hinge pins 37 are disposed adjacent the back side of body 30, proximate the top edge thereof. Peripheral lip 38 extending about the periphery of body 30, including portions of the back, front, left and right sides of body 30, serves as a stop member for closure of lid 50 upon attachment of lid 50 to body 30. Two locking flanges 39 each engage retaining rib 63 of an associated locking clamp 60 in a snap-fit engagement, permitting locking closure of lid 50 covering the top opening of body 30, sealing off interior 31 thereof. As best seen in FIG. 8, tackle box body 30 further includes second rod holding channel 40. While first rod holding channel 35 is disposed within interior 31 of body 30, and is substantially enclosed upon closure of lid 50, second rod holding channel 40, disposed on a bottom surface of body 30, remains exposed and accessible to the exterior of body 30.

Tackle box body 30 further includes two opposing insert retaining channels 41, each extending vertically through body 30 between first rod holding channel 35 and second rod holding channel 40. Each insert retaining channel 41 includes two opposing insert retaining ribs 42, with an aperture therebetween, the aperture providing communication between first rod holding channel 35 and second rod holding channel 40. Hanger 45, extending from a top outer surface of body 30, permits the present tackle box and, in turn, both fishing tackle retained therein and a releasably attached fishing rod, to be hung from a suitable hook, such as a hook that may form part of a point-of-purchase display for the present apparatus.

Lid 50, which may be constructed of a plastic material that is somewhat more flexible and resilient than body 30, includes three pairs of hinge knuckles 51, disposed at the rear outer surface of lid 50. Lid 50 is pivotally attached to body 30 through the snap-fit engagement of each hinge knuckle 51 about a corresponding lid hinge pin 37 of body 30. Lid 50 further includes two clamp hinge pins 52, each disposed at the front outer surface of lid 50 and accommodating snap-fit engagement of an associated locking clamp 60. Moreover, lid 50 further includes two opposing rod cutouts 53 at the left and right sides of lid 50, respectively, permitting a portion of a fishing rod to be retained within interior 31 of body 30, with opposing ends of the portion of the fishing rod extending through respective rod cutouts 53. Bottom edge 54 of lid 50 engages peripheral lip 38 of body 30 upon closure of lid 50 atop body 30, providing a relatively tight seal therebetween.

Each of two locking clamps 60, preferably constructed of a relatively rigid plastic material, includes body 61, having arcuate hinge knuckle 62 disposed at one end and permitting snap-fit pivotal engagement about an associated clamp hinge pin 52 of lid 50. Retaining rib 63 is disposed at an opposing end of body 61 and engages an associated locking flange 39 of tackle box body 30, permitting releasable, snap-fit engagement of retaining rib 63 to locking flange 39 to, in term, provide snap-fit locking closure of locking claim 60, thereby locking lid 50 in its closed orientation.

Figure 3:
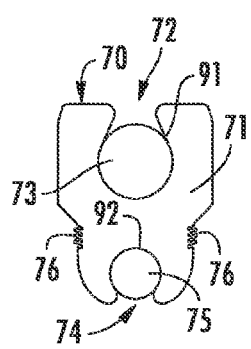
FIG. 3 is a top plan view of a first rod holding insert of the present invention showing, in particular, cross-sections of top and bottom halves of a fishing rod releasably held and retained by the insert.

First rod holding insert 70, which may be constructed of a relatively resilient material, such as a thermoplastic resin, is shown in FIG. 3 holding bottom half 91 of a fishing rod (shown in cross-section) and top half 92 of the same fishing rod (also shown in cross-section) as comprising body 71, top aperture 72, top cylindrical channel 73, bottom aperture 74, bottom cylindrical channel 75, and two sets of opposing retaining ribs 76.

Figure 4:
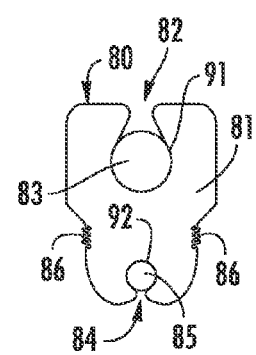
FIG. 4 is a top plan view of a second rod holding insert of the present invention showing, in particular, cross-sections of top and bottom halves of a fishing rod releasably held and retained by the insert.
Figure 5:
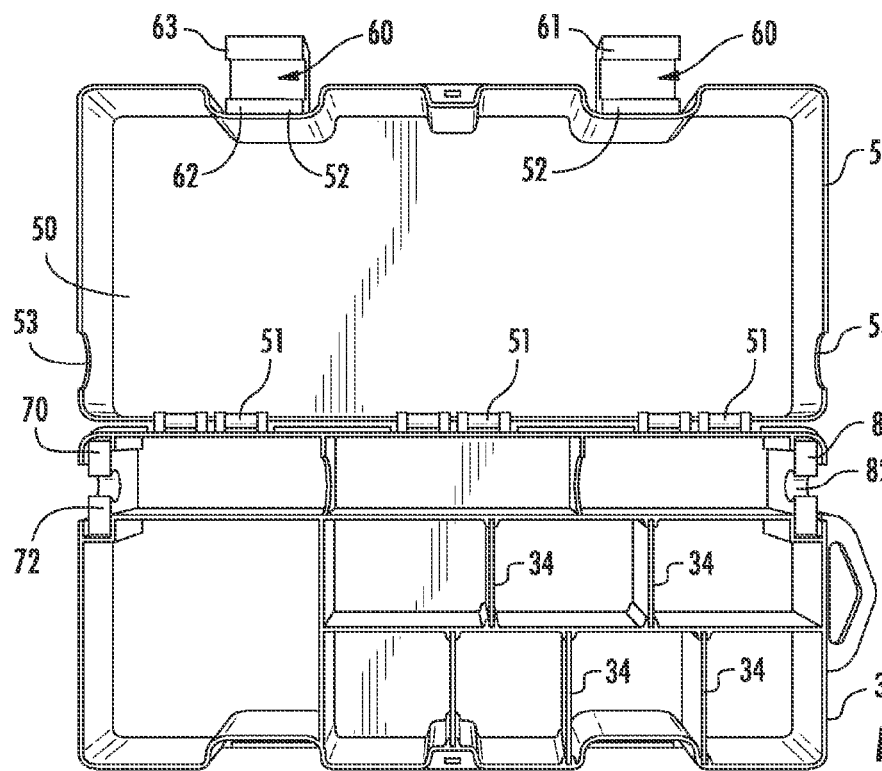
FIG. 5 is a top plan view of a tackle box of the present invention showing, in particular, the attached lid and rod holding inserts.
Figure 6:
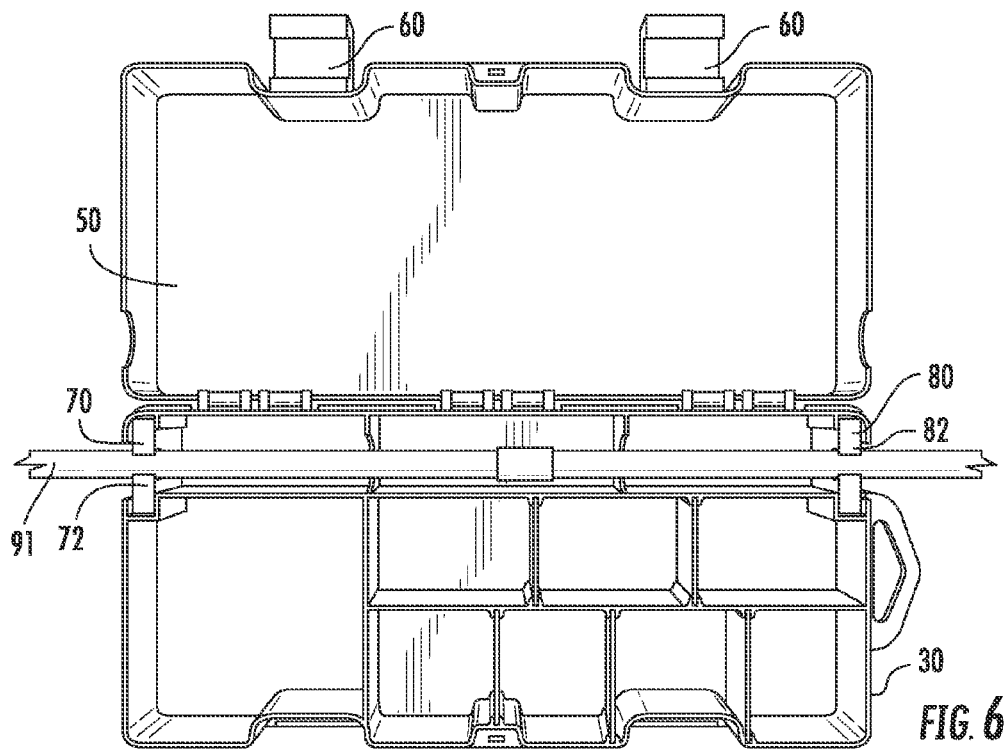
FIG. 6 is a top plan view of the tackle box of FIG. 5 showing, in particular, a bottom half of a two-piece fishing rod held by the rod holding inserts.

Second rod holding insert 80, which may be constructed of a relatively resilient material, such as a thermoplastic resin, is shown in FIG. 4 holding bottom half 91 of a fishing rod (shown in cross-section) and top half 92 of the same fishing rod (also shown in cross-section) as comprising body 81, top aperture 82, top cylindrical channel 83, bottom aperture 84, bottom cylindrical channel 85, and two sets of opposing retaining ribs 86. The resilient nature of the material used to construct the rod holding inserts permit the top and bottom halves of a two-piece fishing rod to be pressed through the top and bottom apertures of the pair of rod inserts, and to be held in a snap-fit arrangement within the top and bottom apertures of the pair of rod inserts and, in turn, to be held in releasable snap-fit attachment to tackle box body 30.

First rod holding insert 70 and second rod holding insert 80 are both releasably attachable to tackle box body 30 by inserting the rod holding insert into an associated insert retaining channel, with opposing ribs 42 each engaging an adjacent retaining rib 76, 86 of rod holding insert 70, 80, respectively. Specifically, each rod holding insert is inserted from the top of body 30, into an insert retaining channel, until the rod holding insert is inserted halfway through the aperture between opposing ribs 42. More specifically, second rod holding insert 80 is so inserted into the insert retaining channel 41 most proximate hanger 45 of body 30, while first rod holding insert 70 is so inserted into the insert retaining channel most distant from hanger 45 of body 30. Once so inserted, top apertures 72, 82 and top cylindrical channels are all disposed within first rod holding channels 35. At the same time, bottom apertures 74, 84 and bottom cylindrical channels 75, 85 are all disposed within second rod holding channel 40. The engagement of opposing ribs 42 with retaining ribs 76 and 86 are sufficient to hold rod holding inserts 70 and 80 securely in this position, yet, due to the resilient nature of the materials used to construct the rod holding inserts, still permit the rod holding inserts to be removed from tackle box body 30 through the application of sufficient force. This, in turn, permits various, differently-dimensioned embodiments of first rod holding insert 70 and second rod holding insert 80 to be interchangeably employed, permitting different fishing rods of various diameters to be coupled and releasably held by the same tackle box body 30. In particular, as explained in further detail below, the interchangeable sizes of the various embodiments of first rod holding insert 70 and second rod holding insert 80 have the same general peripheral outer dimensions, yet have differently sized top apertures, bottom apertures, top cylindrical channels, and bottom cylindrical channels, each custom sized to permit the snap-fit attachment of top and bottom halves of a two-piece fishing rod to the rod holding inserts and, in turn, permit the attachment of the rod halves to tackle box body 30.

Referring to FIGS. 3 and 4, in comparing first rod holding insert 70 with first rod holding insert 80, it is apparent that top aperture 72 is wider than top aperture 82; top cylindrical channel 73 is larger in diameter than top cylindrical channel 83; bottom aperture 74 is wider than bottom aperture 84; and bottom cylindrical channel 75 is larger in diameter than bottom cylindrical channel 85. Inasmuch as first rod holding insert 70 and second rod holding insert 80 are held within body 30 in a spaced arrangement, due to each insert retaining channel 41 being at an opposing end of first rod holding channel 35 and second rod holding channel 40, these dimensional differences between the rod holding inserts permit the inserts to accommodate and securely hold the tapered cross-sectional dimensions of the top and bottom halves of a two-piece fishing rod, with the larger diameter portions of the rod halves being disposed away from hanger 45 of tackle box body 30. As shown in FIGS. 3 and 4, bottom half 91 of the fishing rod is larger in cross-section where it is engaged by first rod holding insert 70 than where it is engaged by second rod holding insert 80. Similarly, top half 92 of the fishing rod is larger in cross-section where it is engaged by first rod holding insert 70 than where it is engaged by second rod holding insert 80.

The following table shows the various dimensions that may be used for first rod holding insert 70, the various cross-sectional dimensions of fishing rods that may be accommodated by the various dimensions, and the general types of fishing rods accommodated by each size.

| Size | Nominal diameter of fishing rod at position held by top cylindrical channel 73 (in millimeters) | Nominal diameter of fishing rod at position held by bottom cylindrical channel 75 (in millimeters) | Range of rod diameters at position held by top cylindrical channel 73 (in millimeters) | Range of rod diameters at position held by bottom cylindrical channel 75 (in millimeters) | Types of fishing rods accommodated |
| --- | --- | --- | --- | --- | --- |
| Small | 10.30 | 4.07 | 7.72-10.30 | 3.54-4.07 | Panfish, fly |
| Medium | 11.80 | 5.44 | 10.20-12.52 | 4.97-5.98 | pike, bass, trout, walleye |
| Large | 14.60 | 6.90 | 14.60-15.88 | 6.90-8.10 | king salmon, striper, salmon, catfish |

The following table shows the various dimensions that may be used for second rod holding insert 80, the various cross-sectional dimensions of fishing rods that may be accommodated by the various dimensions, and the general types of fishing rods accommodated by each size.

| Size | Nominal diameter of fishing rod at position held by top cylindrical channel 83 (in millimeters) | Nominal diameter of fishing rod at position held by bottom cylindrical channel 85 (in millimeters) | Range of rod diameters at position held by top cylindrical channel 83 (in millimeters) | Range of rod diameters at position held by bottom cylindrical channel 85 (in millimeters) | Types of fishing rods accommodated |
| --- | --- | --- | --- | --- | --- |
| Small | 9.34 | 5.72 | 7.25-9.34 | 7.25-9.34 | Panfish, fly |
| Medium | 10.52 | 6.55 | 9.74-11.23 | 6.07-7.00 | pike, bass, trout, walleye |
| Large | 14.36 | 9.66 | 13.34-14.45 | 8.81-9.66 | king salmon, striper, salmon, catfish |

As can be seen, the present invention provides a distinct advantage, as compared to a non-reconfigurable means of attaching a fishing rod to a tackle box. Through the use of pairs of custom-sized rod holding inserts, previously manufactured in bulk quantities, the same tackle box body 30, likewise manufactured in bulk quantities, may be combined with a pair of rod holding inserts of a specific, predetermined size in order to hold a matching specifically sized fishing rod, thus enabling the use of a single design of a tackle box body 30 to hold a variety of differently sized fishing rods, depending upon the particular application of the overall rod/reel/line/tackle combination unit being assembled for distribution and sale.

Many modifications and variations of the present invention are possible in light of the above teachings. It is therefore to be understood that within the scope of the appended claims, the invention may be practiced other than as specifically described. Various modifications, changes and variations may be made in the arrangement, operation and details of construction of the invention disclosed herein without departing from the spirit and scope of the invention. The present disclosure is intended to exemplify and not limit the invention.

What is claimed is:
1. A fishing tackle box, comprising:
a substantially rigid body having an interior;
the interior of the body having a plurality of compartments configured for storing fishing tackle;
a first longitudinal channel extending through the interior of the body from a first opening at a first end of the body to a second opening at a second, opposing end of the body;
a second longitudinal channel extending through the body from a third opening at the first end of the body to a fourth opening at the second end of the body, the first longitudinal channel being separated from the second longitudinal channel by a wall of the body;
an opening extending through the wall, communicating with both the first longitudinal channel and the second longitudinal channel, and forming a passage between the first longitudinal channel and the second longitudinal channel;
a first fishing rod holding member configured to releasably hold both a first portion of a fishing rod and a second portion of the fishing rod;
a portion of the first fishing rod holding member being disposed within the first longitudinal channel;
a portion of the first fishing rod holding member being disposed within the second longitudinal channel;
a portion of the first fishing rod holding member being disposed within the opening of the wall and releasably attached to the wall at the opening and being removable and replaceable from the body by drawing at least a portion of the first fishing rod holding member through the opening of the wall;
the first fishing rod holding member being positioned and configured to releasably hold the first portion of the fishing rod within the first longitudinal channel by snap-fit engagement of the first portion of the fishing rod; and
the first fishing rod holding member being positioned and configured to releasably hold the second portion of the fishing rod within the second longitudinal channel by snap-fit engagement of the second portion of the fishing rod.
2. The fishing tackle box according to claim 1, wherein the first longitudinal channel is substantially parallel to the second longitudinal channel.
3. The fishing tackle box according to claim 1, wherein the first fishing rod holding member comprises a first aperture and a first rod holding channel, the first portion of the fishing rod being insertable through the first aperture to be held within the first rod holding channel in snap-fit engagement with the first fishing rod holding member.

4. The fishing tackle box according to claim 1, wherein:
the first fishing rod holding member comprises a first aperture and a first rod holding channel, the first portion of the fishing rod being insertable through the first aperture to be held within the first rod holding channel in snap-fit engagement with the first fishing rod holding member; and
the first fishing rod holding member further comprises a second aperture and a second rod holding channel, the second portion of the fishing rod being insertable through the second aperture to be held within the second rod holding channel in snap-fit engagement with the second fishing rod holding member.

5. The fishing tackle box according to claim 1, further comprising a lid coupled to the body, at least a portion of the first longitudinal channel extending through the lid, and at least another portion of the first longitudinal channel extending through the body.

6. The fishing tackle box according to claim 1, further comprising a lid coupled to the body, at least a portion of the first opening of the first longitudinal channel extending through the lid, and at least another portion of the first opening of the first longitudinal channel extending through the body.

7. The fishing tackle box according to claim 1, further comprising a lid coupled to the body, at least a portion of the second opening of the first longitudinal channel extending through the lid, and at least another portion of the second opening of the first longitudinal channel extending through the body.

8. The fishing tackle box according to claim 1, further comprising a lid coupled to the body, at least a portion of the first fishing rod holding member being accessible externally to the body only upon opening the lid relative to the body.

9. The fishing tackle box according to claim 8, wherein at least another portion of the first fishing rod holding member is accessible externally to the body, regardless of whether the lid is in an open or closed position.

* * * * *